(12) United States Patent
Li et al.

(10) Patent No.: US 11,577,423 B2
(45) Date of Patent: Feb. 14, 2023

(54) RECIPROCATING SAW

(71) Applicant: Globe (Jiangsu) Co., Ltd., Changzhou (CN)

(72) Inventors: Xiazi Li, Changzhou (CN); Tao Wang, Changzhou (CN)

(73) Assignee: Globe (Jiangsu) Co., Ltd., Changzhou (CN)

( * ) Notice: Subject to any disclaimer, the term of this patent is extended or adjusted under 35 U.S.C. 154(b) by 0 days.

(21) Appl. No.: 17/499,866

(22) Filed: Oct. 13, 2021

(65) Prior Publication Data

US 2022/0118645 A1 Apr. 21, 2022

(30) Foreign Application Priority Data

Oct. 16, 2020 (CN) .......................... 202011108296.0

(51) Int. Cl.
*B27G 19/00* (2006.01)
*B27B 19/00* (2006.01)

(52) U.S. Cl.
CPC .......... *B27G 19/006* (2013.01); *B27B 19/002* (2013.01)

(58) Field of Classification Search
CPC ............................ B27G 19/006; B27B 19/002
USPC ......................................................... 30/394
See application file for complete search history.

(56) References Cited

U.S. PATENT DOCUMENTS

| | | | | |
|---|---|---|---|---|
| 7,497,154 B2* | 3/2009 | Delfini | ................. | B23D 51/025 30/392 |
| 8,327,550 B2* | 12/2012 | Wilson | ................... | B23D 51/10 30/392 |
| 8,555,516 B2* | 10/2013 | Graca | .................. | B23D 49/167 30/392 |
| 2002/0017026 A1* | 2/2002 | Kakiuchi | ............... | B23D 51/10 30/523 |
| 2008/0168666 A1* | 7/2008 | Zhou | ..................... | B23D 51/10 30/339 |

FOREIGN PATENT DOCUMENTS

| | | |
|---|---|---|
| CN | 201026536 Y | 2/2008 |
| EP | 0693341 A1 | 1/1996 |
| EP | 1325790 A2 | 7/2003 |
| WO | 2012121994 A1 | 5/2020 |

* cited by examiner

*Primary Examiner* — Omar Flores Sanchez

(57) ABSTRACT

A reciprocating saw comprises a housing, a blade assembly, a reciprocating rod assembly, a driving assembly and an operation mechanism. The blade assembly extends forward from one side of the housing, and comprises a positioning structure. The reciprocating rod assembly is detachably connected with the blade assembly and comprises a blade fixing structure and an unlocking component matched with the positioning structures. The driving assembly is accommodated in the housing, and drives the reciprocating rod assembly to drive the blade assembly to perform reciprocating motion. The operation mechanism is installed on the housing and moves between a locking position and an unlocking position and comprises an operation button, a drive cam matched with the unlocking components and an elastic reset component for resetting the operation button.

11 Claims, 4 Drawing Sheets

RECIPROCATING SAW

CROSS-REFERENCE TO RELATED APPLICATIONS

This application claims priority to and the benefit from Chinese Patent Application No. 202011108296.0, filed on Oct. 16, 2020, the disclosure of which is hereby incorporated by reference herein in its entirety for all purposes.

TECHNICAL FIELD

The disclosure relates to a garden tool, in particular to a reciprocating saw.

BACKGROUND

Reciprocating saw is a common power tool, through the rotation generated by the motor to drive the reciprocating rod to move back and forth, further to drive the blade to move back and forth to perform the cutting function. The operation mechanism for releasing the blade on the reciprocating saw is commonly selected as a knob or a push button both of which have their advantages and disadvantages. Push button operation mechanism is quick and easy while releasing, the user experience is comfortable. But, due to the push button is commonly set at the handling part of the human hand, during user operation process, there is a possibility of accidentally touching the push button causing the blade to release, resulting in a dangerous situation. From the view of safety, a knob operation mechanism is more reliable than the push button operation mechanism. Besides, due to a gap after the blade installed on the tool, the blade is easily to generate vibration during moving driven by the motor, therefore, how to make the connection and positioning between the reciprocating rods and the blades reliable and firm is also a very concerned problem in this field.

Therefore, it is necessary to design an improved reciprocating saw to overcome the above problems.

SUMMARY

The disclosure provides a reciprocating saw with a knob/push button operation mechanism, which makes the process of releasing the blade easy, quick, safe and reliable, which leads to a good operating experience.

The disclosure provides a reciprocating saw, and the reciprocating saw comprises: a housing; a blade assembly extending forward from one side of the housing, the blade assembly including a positioning structure; a reciprocating rod assembly, the reciprocating rod assembly and the blade assembly being detachably connected, and the reciprocating rod assembly including a blade fixing structure and an unlocking component matched with the positioning structure; a driving assembly accommodated in the housing, the driving assembly driving the reciprocating rod assembly to drive the blade assembly to perform reciprocating motion; and an operation mechanism, the operation mechanism being installed on the housing and moving between a locking position and an unlocking position, the operation mechanism including an operation button, a drive cam matched with the unlocking component, and an elastic reset component for resetting the operation button.

As a further improvement of the disclosure, the unlocking component comprises an unlocking push rod and a rotating shaft, while in the unlocking position, the unlocking push rod is pushed by the drive cam to rotate about the rotating shaft, the blade fixing structure and the positioning structure are separated from each other.

As a further improvement of the disclosure, the blade assembly comprises a first blade and a second blade which are arranged side by side, the reciprocating rod assembly comprises a first reciprocating rod and a second reciprocating rod which are arranged side by side, the unlocking component comprises a pair of unlocking push rods being respectively set on the first reciprocating rod and the second reciprocating rod; in the locking position, the distance between the pair of the unlocking push rods is h, in the unlocking position, the distance between the pair of the unlocking push rods is H, wherein H−h≥2 T, T is a thickness of the blade.

As a further improvement of the disclosure, the blade fixing structure comprises a protrusion, the positioning structure comprises a positioning hole; in the locking position, the protrusion sticks into the positioning hole; in the unlocking position, the protrusion is disengaged from the positioning hole.

As a further improvement of the disclosure, the unlocking push rod and the rotating shaft are respectively located at a front side and a rear side of the reciprocating rod assembly; and the protrusion are located between the unlocking push rod and the rotating shaft.

As a further improvement of the disclosure, the operation button is a knob, the drive cam is set at an end of the knob, the elastic reset component is a torsional spring, the torsional spring is installed at an outer side of a first center column which is located between the knob and the drive cam.

As a further improvement of the disclosure, the drive cam comprises a rounded corner area being in contact with the unlocking push rod, the radius of the rounded corner area gradually increases along a rotating direction of the drive cam when viewed in an axial direction of the first center column.

As a further improvement of the disclosure, the operation button is a push button, the drive cam is set at an end of the push button, the elastic reset component is a pressure spring, a second center column extends from a side of the push button facing the reciprocating rod assembly, the second center column is set with a blind hole within, the pressure spring is set in the blind hole.

As a further improvement of the disclosure, the drive cam comprises a bevel being in contact with the unlocking push rods.

As a further improvement of the disclosure, an inclined guide plane is arranged on one end of the protrusion, and the inclined guide plane is facing the blade assembly.

As a further improvement of the disclosure, the reciprocating rod assembly comprises a magnetic component set between the blade fixing structure and the unlocking component, the magnetic member is mounted behind the blade fixing structure as viewed in an insertion direction of the blade assembly, the blade assembly is at least partially made of ferromagnetic material.

As a further improvement of the disclosure, the reciprocating rod assembly comprises a spring member, an ends of the spring member are connected to the housing, a main body part of the spring member is used to fix the reciprocating rod assembly.

The advantages of the disclosure are that the process of releasing the blade is easy, quick, safe and reliable, and the operating experience is comfortable by adopting the operation mechanism with a knob or a push button.

DETAILED DESCRIPTION

The disclosure is detailly described as below in combination with the various embodiments shown in the figures. However, the disclosure is not limited by these embodiments, and any alternation in structure, method or function made by those skilled in the art according to these embodiments is included in the scope of protection of the disclosure.

Embodiment 1

Figure 1:
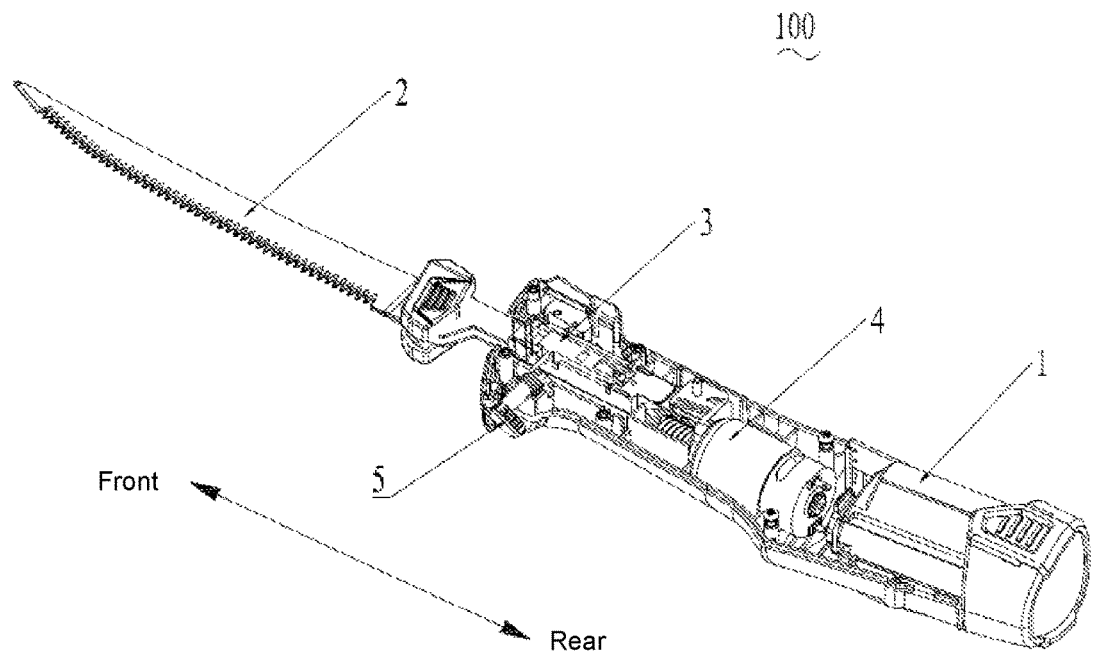
FIG. 1 is a perspective diagram of a reciprocating saw in a first embodiment, with a part of the housing removed.

According to FIG. 1, the disclosure provides a reciprocating saw 100 of embodiment 1, the reciprocating saw 100 comprises a housing 1, a blade assembly 2 extending forward from one side of the housing 1, a reciprocating rod assembly 3 which is detachably connected to the blade assembly 2, and a driving assembly 4. The driving assembly 4 is accommodated in the housing 1, and drives the reciprocating rod assembly 3 to drive the blade assembly 2 moving back and forth. The reciprocating saw 100 further comprises a power supply assembly (not shown) for providing power to the driving assembly 4, the power supply assembly can be a battery system undetachably fixed on the housing 1, or a battery system detachably fixed on the housing 1, which is not limited here. The reciprocating saw 100 of the disclosure also comprises an operation mechanism 5, the operation mechanism 5 is fixed on the housing 1 and moves between a locking position and an unlocking position, for releasing the blade assembly 2.

In conjunction with FIG. 1 to FIG. 4, the blade assembly 2 of the reciprocating saw 100 comprises a first blade 21 and a second blade 22. The first blade 21 and the second blade 22 are set side by side, and both comprise a main body part 201 extending forward from the housing 1 and an installation part 202 on one end of the main body part 201. The main body part 201 is set with cutting sawtooth on the edge thereof, the installation parts 202 are detachably connected to the reciprocating rod assembly 3, so that in operating state, the blade assembly 2 is driven by the reciprocating rod assembly 3 to perform cutting operation, and in released state, the blade assembly 2 can be detached from the reciprocating rod assembly 3. The installation part 202 is set with positioning hole 203, which is used to couple with the blade fixing structures 301 of the reciprocating rod assembly 3 to fix the blade assembly 2.

Figure 6:
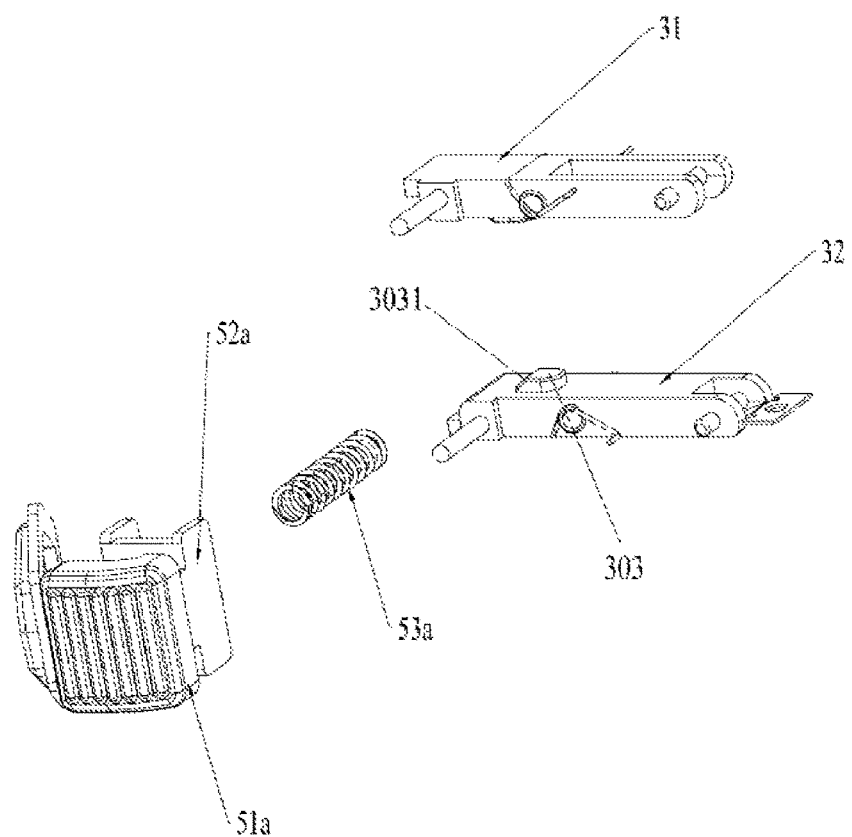
FIG. 6 is an exploded perspective diagram of a push button operation mechanism and a part of a reciprocating rod assembly of the reciprocating saw in the second embodiment.

In this embodiment, the reciprocating rod assembly 3 of the reciprocating saw 100 comprises a first reciprocating rod 31 and a second reciprocating rod 32. The first reciprocating rod 31 and the second reciprocating rod 32 are set side by side, and both comprise the blade fixing structure 301 and an unlocking component 302. Each blade fixing structure 301 comprises a protrusion 303 and a magnetic component 304. The protrusions 303 are respectively set on the corresponding sides of the first reciprocating rod 31 and the second reciprocating rod 32, protrude into the positioning holes to respectively fix the first blade 21, the second blade 22. Preferably, on the sides facing the blade assembly, the protrusions 303 are set with inclined guide planes 3031 (as shown in FIG. 6) at one end, for guiding the blade assembly 2 to be inserted. Observed from the inserting direction of the blade assembly 2, the magnetic components 304 are set behind the protrusions 303. The rear installation parts 202 of the blade assembly 2 are made of ferromagnetic material, magnetic attraction force occurs between the magnetic components 304 and the rear installation parts 202, by which auxiliary fix the blade assembly 2, so as to make the connection between the blade assembly 2 and the reciprocating rod assembly 3 more reliable. In this embodiment, the two magnetic components 304 are set opposite to each other, and the magnetic poles of the two opposite ends are the same, for example both as S poles or vice versa; not limited by the above, the two magnetic poles of the two opposite ends can also be opposite.

In this embodiment, the unlocking components 302 are set beside the protrusions 303, when the operation mechanism 5 and the unlocking components 302 co-operate, the protrusions 303 and the positioning holes 203 detach from each other, the blade assembly 2 can be detached. In detail, the unlocking components 302 comprise a pair of unlocking push rods 305 and a pair of rotating shafts 306. Preferably, the unlocking push rods 305 and the rotating shafts 306 are respectively set at the front and rear side of the reciprocating rod assembly 3, the protrusions 303 and magnetic components 304 are located between the unlocking push rods 305 and the rotating shafts 306, such that the unlocking push rods 305 are pushed by the operation mechanism 5 to rotate around the rotating shafts 306, so as to pull the protrusions 303 out of the corresponding positioning holes 203 to unlock the blade assembly 2. Specifically, when the blade assembly 2 is fixed to the reciprocating rod assembly 3, the distance between the pair of the unlocking push rods 305 is h, pushed by the operation mechanism 5, the distance between the unlocking push rods 305 is enlarged; when the distance becomes H, the first/second blade 21/22 is respectively unlocked from the corresponding first/second unlocking push rods 31/32, at this time, H meets the condition of H−h≥2 T, T is the thickness of one blade. In other words, theoretically, as long as the displacement of one of the unlocking push rods 305 is greater than the thickness of one blade of 21/22, then blades 21/22 can be moved out of the locking state. When the displacements of two unlocking push rods 305 are greater than the thickness of two blades 21, 22, then blades 21, 22 can also be moved out of the locking state.

Besides, the reciprocating rod assembly 3 also comprises spring members 307 respectively set on the first reciprocating rod 31 and the second reciprocating rod 32 (shown in FIG. 7), preferably, the spring members 307 are torsional springs, although the disclosure is not limited to this. The two ends of the pair of spring members 307 are connected to the housing 1, the main body parts 3071 of the spring members 307 are used to respectively fix the first reciprocating rod 31 and the second reciprocating rod 32, so that after the reciprocating rod assembly 3 is pushed/rotated, the reciprocating rod assembly 3 and the unlocking push rods 305 back may be pulled to the initial position.

Figure 2:
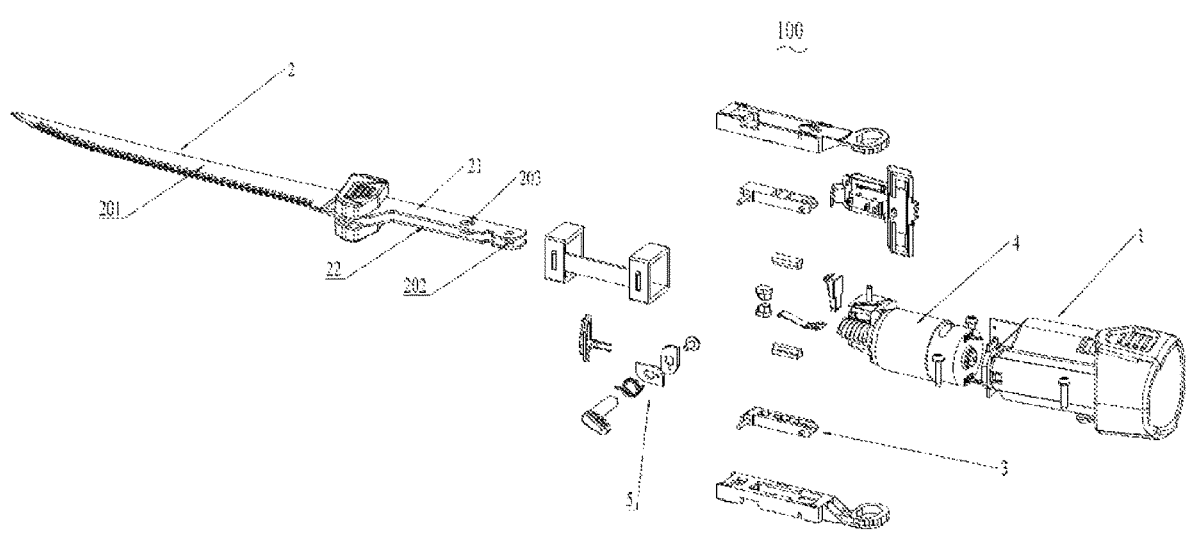
FIG. 2 is an exploded perspective view of a reciprocating saw of the first embodiment.
Figure 3:
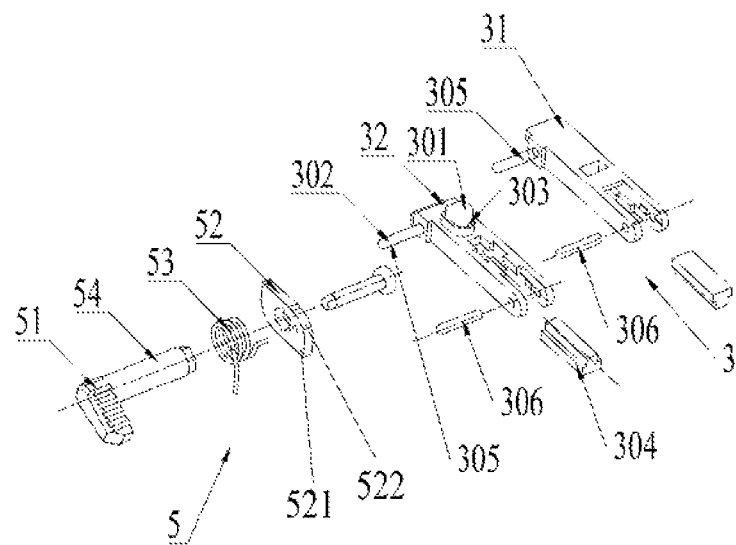
FIG. 3 is an exploded perspective diagram of a knob operation mechanism and a part of a reciprocating rod assembly of the reciprocating saw in the first embodiment.
Figure 4:
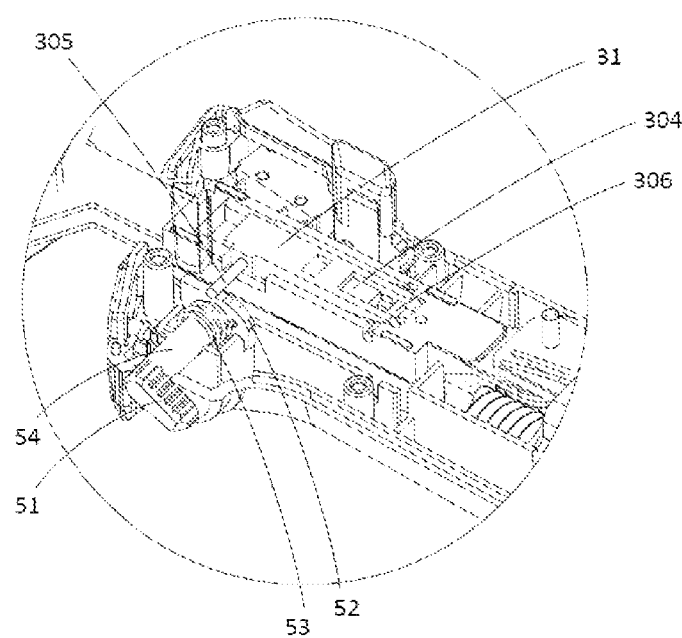
FIG. 4 is a partially enlarged diagram of the knob operation mechanism on the reciprocating saw of FIG. 1.

As shown in FIG. 2, FIG. 3 and FIG. 4, during the process of installing the blade assembly 2, firstly insert the blade assembly 2 directly through the entrance of the housing 1; when the first blade 21 and the second blade 22 meet the protrusions 303 of the first reciprocating rod 31 and the second reciprocating rod 32, the protrusions are pushed outwards and the inserting continues; meanwhile, the magnetic components 304 on the first reciprocating rod 31 and the second reciprocating rod 32 generates magnetic attraction force on the blades 21, 22, until the blades 21, 22 completely go through the protrusions 303 on the first reciprocating rod 31 and the second reciprocating rod 32, and the protrusions 303 stick into and lock into the positioning holes 203 with a "click" sound generated, which means the blades 21, 22 are fulling installed in position.

As the other detail structures of the reciprocating saw 100 are conventional structures in this field, which will not elaborated in this disclosure. The details of the operation mechanism 5 and the role of operation mechanism 5 in releasing the blade assembly 2 are described in detail with an embodiment.

A shown in FIG. 3 and FIG. 4, the operation mechanism 5 includes an operation button 51, a drive cam 52 cooperating with the unlocking components 302, and an elastic reset component 53 for resetting the operation button 51. In this embodiment, the operation button is a knob 51, the drive cam 52 is set at the end of the knob 51, the elastic reset component is a torsional spring 53, the torsional spring 53 is installed at the outside of the first center column 54 which is between the knob 51 and the drive cam 52. When the knob 51 rotates counterclockwise, pushed by the drive cam 52, two unlocking push rods 305 respectively rotate to the opposite direction around the corresponding rotate shafts 306. The drive cam 52 stops after a certain angle is rotated, the positioning holes 203 of the first blade 21, second blade 22 are detached from the protrusions 303 of the first reciprocating rod 31, second reciprocating rod 32. When the knob 51 is rotated to the dead center position, which is the max travel distance of the drive cam 52 being in contact with the unlocking rods 305, under the action of the torsional spring 53, the knob 51 can be reset automatically. Through the view along the axis direction of the first center column 54, the drive cam 52 comprises a sharp angle corner area 521 and a rounded corner area 522. If the initial position/locked position of the cooperation between the drive cam 52 and the unlocking push rods 305 is the position that the blades are in the locking position, when the knob 51 drives the drive cam 52 to rotate clockwise, the rounded corner areas 522 touches the unlocking push rods 305, the dead center position/unlocking position is the position where the protrusions 303 can leave the positioning holes 203 driven by the unlocking push rods, the radius of the rounded corner areas 522 at the initial position/locking position is different from the dead center position/unlocking position. In other words, in this embodiment, the radius of the rounded corner areas 522 gradually increases on the clockwise direction. In this disclosure, the dead center position is also the releasing position, which means the blade assembly 2 can be freely detached in this position. The operation mechanism 5 also comprises a bolt. The bolt fixes the knob 51, the drive cam 52, and the torsional spring 53 in turn onto the reciprocating rod assembly 3 and the housing 2.

As shown in FIG. 4, during the process of releasing the blade assembly 2, firstly rotate the knob 51 counterclockwise to the unlocking position/dead center position; the first reciprocating rod 31 and the second reciprocating rod 32 overcome the magnetic force between the magnet and the blades 21, 22 and each rotates around the rotating shafts 306 oppositely for a certain angle, the blades can be detached from the protrusions 303 of the reciprocating rods 31, 32; then, the blades 21, 22 can be disassembled by external force; finally, the knob 51 returns to the initial position/locking position under the action of the torsional spring 53.

Embodiment 2

Figure 5:
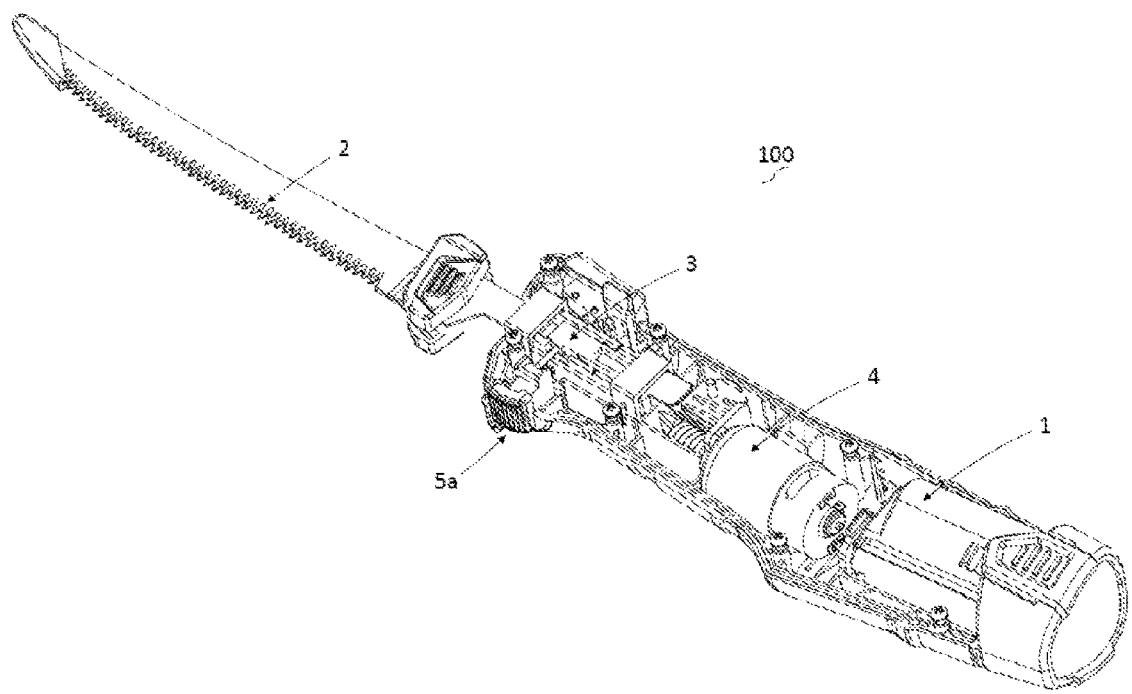
FIG. 5 is a perspective diagram of a reciprocating saw of a second embodiment, with a part of the housing removed.
Figure 7:
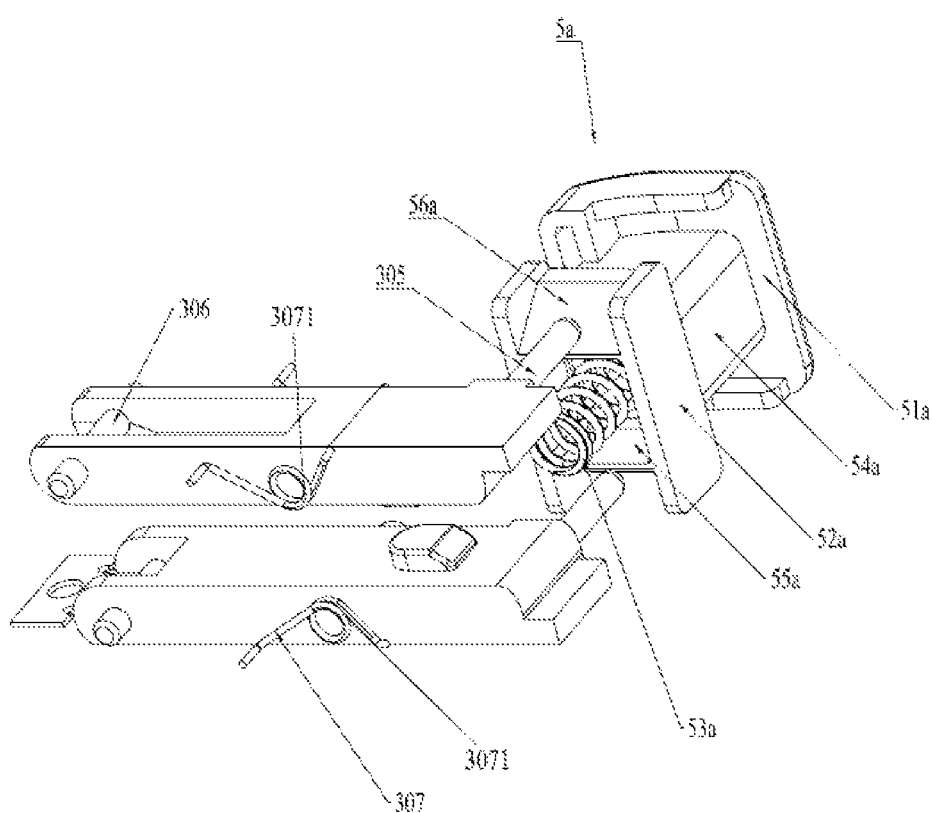
FIG. 7 is a perspective diagram from another view angel of the push button operation mechanism and a part of the reciprocating rod assembly.

The disclosure also provides a reciprocating saw of embodiment 2, in which the structure is substantially the same as that of the reciprocating saw of the first embodiment except that the operating mechanism 5a is different from that of the reciprocating saw of the first embodiment, and for convenience of understanding, the numbering of the other structures except for the operating mechanism follows the numbering in the first embodiment. As shown in FIG. 5 to FIG. 7, the operation mechanism 5a comprises an operation button 51a, a drive cam 52a cooperating with the unlocking components 302 and an elastic reset component 53a for resetting the operation button 51a. In this embodiment, the operation button is a push button 51a, the drive cam 52a is set at the end of the knob 51a, the elastic reset component is a pressure spring 53a. A second center column 54a is set on the side, of the push button 51a, facing the reciprocating rod assembly 3, a blind hole 55a is opened in the second center column 54a, the pressure spring 53a is installed in the blind hole 55a. The drive cam 52a is set with a pair of bevels 56a symmetrically, the bevels 56a are contact with the unlocking push rods 305 respectively ao as to push the unlocking push rods 305 to drive the first reciprocating rod 31 and the second reciprocating rod 32 to rotate around the rotating shafts 306 oppositely.

As the reciprocating rod assembly 3 also comprises spring members 307 respectively set on the first reciprocating rod 31 and the second reciprocating rod 32, when the push button 51a is in the initial position/locking position, the springs 307 are in natural states, when the push button 51a is in the unlocking position/dead center position, the spring members 307 are in compressed states. During the process of releasing the blade assembly 2, the push button 51a is firstly pressed to the dead center position; the bevels 56a push the pair of unlocking push rods 305 to move to two sides, the first reciprocating rod 31 and the second reciprocating rod 32 overcome the elastic force of the pressure springs 307, rotate about the rotating shafts 306 rotate by a certain angle in opposite directions around in opposite directions around the rotating shaft 306 under the driving of the unlocking push rods 305 by overcoming the elastic force of the spring members 307; then the blades 21, 22 are released from the protrusions 303 of the reciprocating rods 31, 32; then, the blades 21, 22 can be disassembled by external force; finally, the push button 51a is released, and the push button 51a is reset under the action of the pressure spring 53a, such that the disassembling of the blades is accomplished. The reciprocating saw 100 of the disclosure uses the operation mechanism with a knob 51 or a push button 51a, to make the disassembling process of the blades easier, quicker, safer, more reliable and with a good operating experience.

What needs to be understood is that although this disclosure describes according to the embodiments, but not each embodiment contains only one independent technical scheme, the narration mode of this disclosure is only for clarity, those skilled in the art shall take the disclosure as a whole, the various technical solutions of the embodiments can also be properly combined, which form other embodiments that can be understood by those skilled in the art.

The series of detailed descriptions listed above are only specific descriptions of the feasible embodiments of the disclosure, and they are not used to limit the scope of protection of the disclosure, any equivalent embodiment or alteration which is not separated from the technical spirit of the disclosure shall be included in the scope of protection of the disclosure.

What is claimed is:

1. A reciprocating saw, comprising:
a housing;
a blade assembly extending forward from one side of the housing, the blade assembly including a positioning structure;
a reciprocating rod assembly, the reciprocating rod assembly and the blade assembly being detachably connected, and the reciprocating rod assembly including a blade fixing structure coupled with the positioning structure and an unlocking component;
a driving assembly accommodated in the housing, the driving assembly driving the reciprocating rod assembly to drive the blade assembly to perform reciprocating motion; and
an operation mechanism, the operation mechanism being installed on the housing and moving between a locking position and an unlocking position, the operation mechanism including an operation button, a drive cam matched with the unlocking component, and an elastic reset component for resetting the operation button;
wherein the unlocking component comprises an unlocking push rod and a rotating shaft, while in the unlocking position, the unlocking push rod is pushed by the drive cam to rotate about the rotating shaft, the blade fixing structure and the positioning structure are separated from each other.

2. The reciprocating saw according to claim 1, wherein the blade assembly comprises a first blade and a second blade which are arranged side by side, the reciprocating rod assembly comprises a first reciprocating rod and a second reciprocating rod which are arranged side by side, the unlocking component comprises a pair of unlocking push rods being respectively set on the first reciprocating rod and the second reciprocating rod; in the locking position, the distance between the pair of the unlocking push rods is h, in the unlocking position, the distance between the pair of the unlocking push rods is H, wherein H−h≥2 T, T is a thickness of the blade.

3. The reciprocating saw according to claim 1, wherein the blade fixing structure comprises a protrusion, the positioning structure comprises a positioning hole; in the locking position, the protrusion sticks into the positioning hole; in the unlocking position, the protrusion is disengaged from the positioning hole.

4. The reciprocating saw according to claim 3, wherein the unlocking push rod and the rotating shaft are respectively located at a front side and a rear side of the reciprocating rod assembly; and the protrusion are located between the unlocking push rod and the rotating shaft.

5. The reciprocating saw according to claim 4, wherein the operation button is a knob, the drive cam is set at an end of the knob, the elastic reset component is a torsional spring, the torsional spring is installed at an outer side of a first center column which is located between the knob and the drive cam.

6. The reciprocating saw according to claim 5, wherein the drive cam comprises a rounded corner area being in contacted with the unlocking push rod, the radius of the rounded corner area gradually increases along a rotating direction of the drive cam, when viewed in an axial direction of the first center column.

7. The reciprocating saw according to claim 4, wherein the operation button is a push button, the drive cam is set at an end of the push button, the elastic reset component is a pressure spring, a second center column extends from a side of the push button facing the reciprocating rod assembly, the second center column is set with a blind hole within, the pressure spring is set in the blind hole.

8. The reciprocating saw according to claim 7, wherein the drive cam comprises a bevel being in contacted with the unlocking push rod.

9. The reciprocating saw according to claim 3, wherein an inclined guide plane is arranged on one end of the protrusion, and the inclined guide plane is facing the blade assembly.

10. The reciprocating saw according to claim 1, wherein the reciprocating rod assembly comprises a magnetic component set between the blade fixing structure and the unlocking component, the magnetic member is mounted behind the blade fixing structure as viewed in an insertion direction of the blade assembly, the blade assembly is at least partially made of ferromagnetic material.

11. The reciprocating saw according to claim 1, wherein the reciprocating rod assembly comprises a spring member, an end of the spring member is connected to the housing, a main body part of the spring member fixes the reciprocating rod assembly.

* * * * *